UNITED STATES PATENT OFFICE.

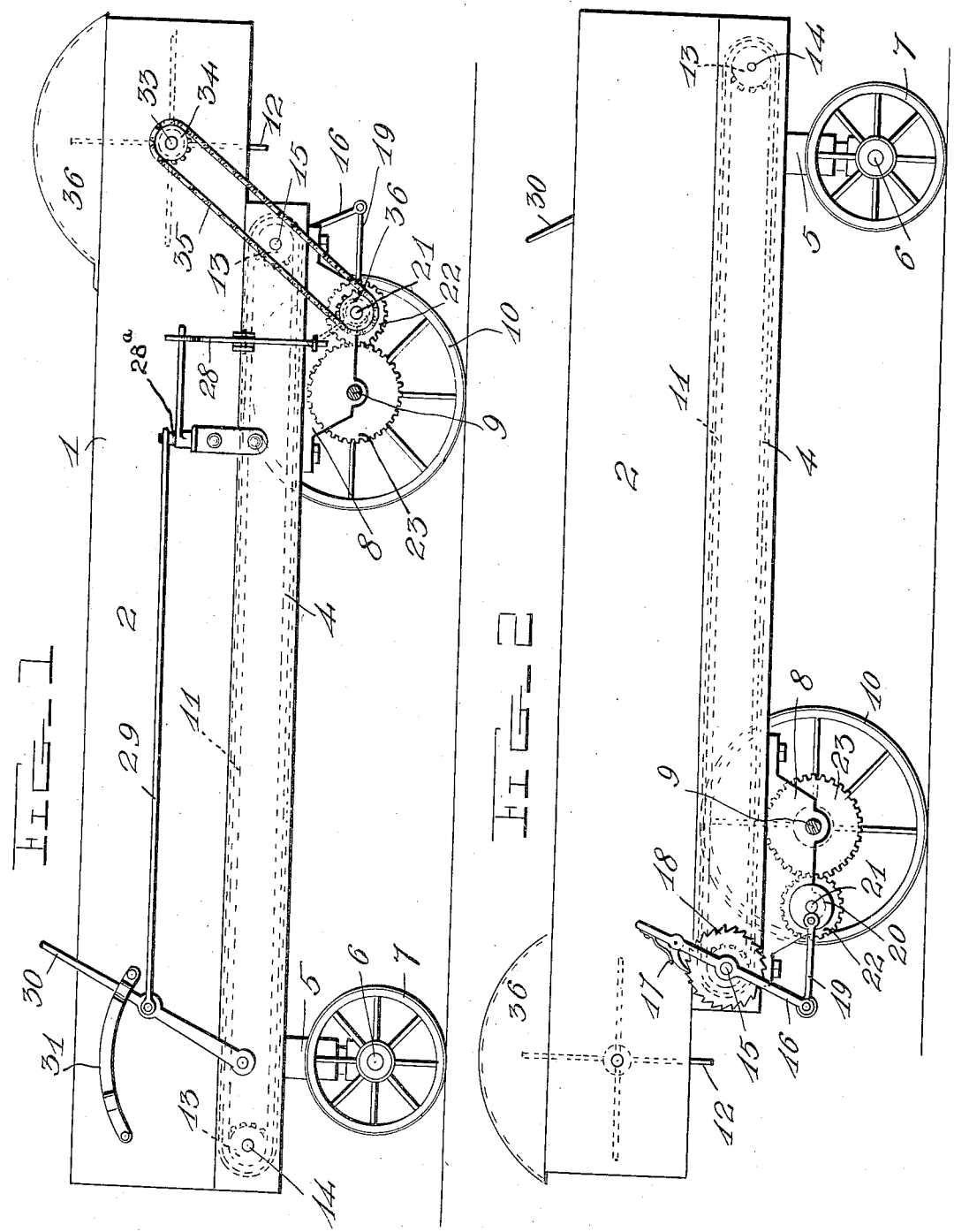

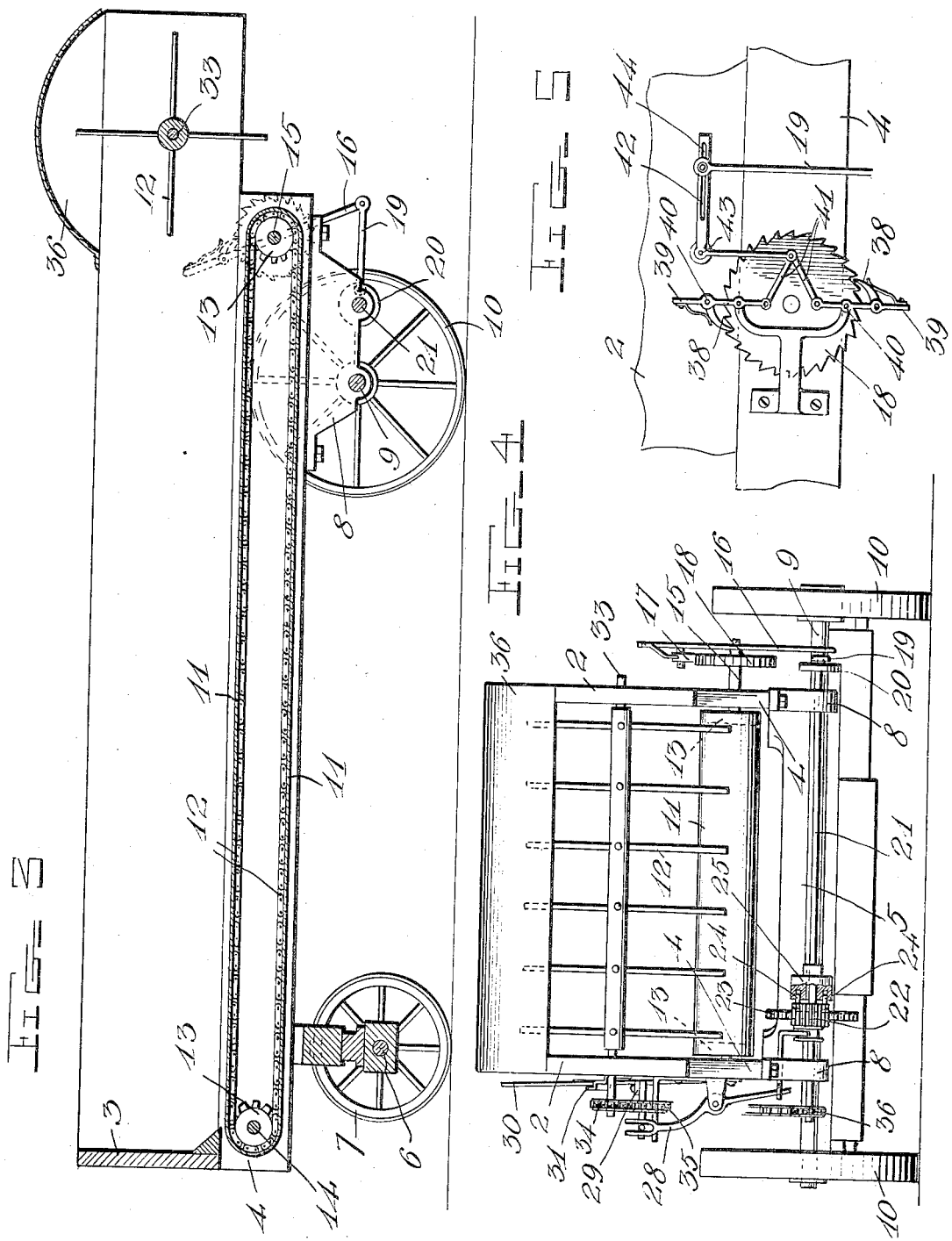

BERTIE E. MILLER, OF BRANDON, IOWA.

MANURE-SPREADER.

No. 863,550.          Specification of Letters Patent.          Patented Aug. 13, 1907.

Application filed February 5, 1906. Serial No. 299,607.

To all whom it may concern:

Be it known that I, BERTIE E. MILLER, a citizen of the United States, residing at Brandon, in the county of Buchanan and State of Iowa, have invented certain new and useful Improvements in Manure-Spreaders; and I do declare the following to be a full, clear, and exact description of the invention, such as will enable others skilled in the art to which it appertains to make and use the same.

My invention relates to improvements in manure spreaders or fertilizer distributers and consists in the novel construction, combination and arrangement of parts hereinafter described and claimed.

In the accompanying drawings Figure 1 is an elevation of one side of my improved manure spreader; Fig. 2 is a similar view of the other side of the same; Fig. 3 is a vertical longitudinal sectional view; Fig. 4 is a rear end elevation of the machine, and Fig. 5 is a detail view of a slightly modified form of the driving means for the endless apron which forms the bottom of the wagon body.

Referring to the drawings by numeral, 1 denotes my improved spreader or distributer for manure or the like, which consists of a wagon body having sides 2 connected by a front end 3 and secured upon longitudinal bed pieces or beams. The bed pieces or beams 4 are connected at their forward ends to a bolster 5, to which is pivotally connected the forward axle 6, carrying supporting wheels 7. To the rear portions of the bed pieces or beams 4 are secured bearings 8, in which is mounted the rear shaft or axle 9, which has upon its ends supporting and drive wheels 10. The bottom of the wagon body is formed by the upper stretch of an endless apron or belt 11, which latter is adapted to feed the manure or fertilizer upon it out of the rear end of the same, which end is closed by a rotary beater 12. This endless apron 11 has its side edges attached to sprocket chains 12 which pass over sprocket wheels 13 secured upon shafts 14—15 mounted in suitable bearings in the bed pieces or beams 4.

The apron 11 is adapted to be slowly rotated in a rearward direction by a step by step movement which is effected by a mechanism consisting of a lever 16 pivotally mounted intermediate its ends upon one end of the shaft 15. This lever 16 has pivotally mounted upon one of its ends a pawl or dog 17, which is adapted to engage the teeth of a ratchet wheel 18 secured upon the shaft 15. The opposite end of the lever 16 is adjustably connected to one end of a link 19, which has its opposite end pivotally connected to a crank disk 20. The latter is secured upon a transverse shaft 21 journaled in suitable bearings in the brackets 8. This shaft 21 is adapted to be driven from the main shaft or axle 9 by a gear 23 secured upon the latter and meshing with a pinion 22, which is mounted to slide upon the shaft 21, but is free to rotate thereon. Said pinion 22 has at one of its ends, studs or projections 24, which are adapted to form one member of a clutch and to enter recesses or apertures formed in a plate or head 25, which is keyed to the shaft 21 and forms the stationary member of the clutch. It will be seen that when the pinion 22 is shifted longitudinally to cause the clutch members 24—25 to engage each other, the motion of the axle 9 will be imparted to the shaft 21, and that when said pinion is shifted to separate said clutch member, the pinion will rotate independent of the shaft 21. Said pinion 22 is shifted by a shipper lever 28, which is suitably pivoted and connected, by means of a bell-crank lever 28ª and a rod or link shown at 29, to a hand lever 30 mounted upon the forward portion of the wagon body. Said lever 30 coacts with the locking rack 31, which secures it in an adjusted position. By shifting the lever 30, the pinion may be moved to throw the pinion 22 and hence the clutch member 24 into and out of engagement with the member 25 and thus throw the machine into and out of operation.

The rotary beater 12 may be of any desired form and construction and is secured upon a transverse shaft 33, which has upon one of its ends a sprocket wheel 34. The latter is connected by sprocket chain 35 to a sprocket wheel 36 upon the shaft 21, so that said beater will be driven from said shaft and will be started and stopped by the operation of the hand lever 30. I preferably provide over the top of the beater 12, a hood or cover 36.

In Fig. 5 of the drawings I show a slightly modified form of driving mechanism for the endless apron or belt 14. As here shown, the two spring actuated pawls 38 engage the ratchet wheel 18 at opposite points and are mounted upon the ends of levers 39 which are pivoted intermediate their ends at 40 and have their inner ends connected by links 41 to one arm of the bell crank lever 42. The latter is pivoted at its angle, as at 43, and in its slotted end or arm 44 is adjustably secured one end of the link 19.

The operation of this mechanism for imparting a step by step movement to the apron 11 will be readily understood from the foregoing description taken in connection with the accompanying drawings, without requiring a more extended explanation.

Having thus described my invention, what I claim as new and desire to secure by Letters-Patent is:—

A manure spreader having an endless apron forming the bottom of the body and provided on one of its shafts with a ratchet wheel, a rotary beater having a sprocket wheel, an axle provided with a master gear, a counter-shaft having a fixed clutch member and a sprocket wheel, an endless sprocket chain connecting the sprocket wheels of the beater and counter-shaft a rocking element mounted on the same shaft with the ratchet wheel, a pitman connecting the crank and rocking element and coacting with the ratchet wheel to actuate the endless apron, a long pinion, continuously engaged with the master gear, loose and slidable on the counter-shaft, and having a clutch member, and a lever linked to said long pinion to shift it and engage its clutch member with or disengage the same from that of the counter-shaft, a bell crank on the body having one arm connected to the shifting lever and the other to an operating lever near the front of the body, substantially as specified.

In testimony whereof I have hereunto set my hand in presence of two subscribing witnesses.

B. E. MILLER.

Witnesses:
HENRY F. MILLER,
ELMER G. HOWARD.